United States Patent
Komiyama et al.

(10) Patent No.: US 7,487,023 B2
(45) Date of Patent: Feb. 3, 2009

(54) CONSTRUCTION MACHINE

(75) Inventors: Masayuki Komiyama, Hiroshima (JP);
Masayuki Kagoshima, Hiroshima (JP)

(73) Assignee: Kobelco Construction Machinery Co., Ltd., Hiroshima-shi (JP)

(*) Notice: Subject to any disclaimer, the term of this patent is extended or adjusted under 35 U.S.C. 154(b) by 7 days.

(21) Appl. No.: 11/537,190

(22) Filed: Sep. 29, 2006

(65) Prior Publication Data
US 2007/0096667 A1    May 3, 2007

(30) Foreign Application Priority Data
Oct. 27, 2005  (JP)  ............................. 2005-312737
Oct. 27, 2005  (JP)  ............................. 2005-312738

(51) Int. Cl.
*G06F 7/70* (2006.01)
(52) U.S. Cl. ............................. 701/50; 37/348; 37/443; 701/102; 701/110; 318/98
(58) Field of Classification Search ............... 701/50, 701/102, 110; 37/348, 443; 60/413; 318/98
See application file for complete search history.

(56) References Cited

U.S. PATENT DOCUMENTS

| | | | |
|---|---|---|---|
| 5,065,320 A | | 11/1991 | Hayashi et al. |
| 5,999,872 A | | 12/1999 | Kinugawa et al. |
| 6,666,022 B1 | * | 12/2003 | Yoshimatsu et al. ............ 60/413 |
| 6,789,335 B1 | | 9/2004 | Kinugawa et al. |
| 2003/0132729 A1 | * | 7/2003 | Yoshimatsu .................. 320/104 |
| 2004/0088103 A1 | * | 5/2004 | Itow et al. ................... 701/110 |
| 2004/0148817 A1 | * | 8/2004 | Kagoshima et al. ............ 37/348 |
| 2005/0001606 A1 | * | 1/2005 | Kagoshima .................. 323/371 |
| 2007/0229007 A1 | * | 10/2007 | Morinaga .................... 318/268 |

FOREIGN PATENT DOCUMENTS

| | | |
|---|---|---|
| JP | 8-49258 | 2/1996 |
| JP | 8-49259 | 2/1996 |
| JP | 8-291541 | 11/1996 |
| JP | 9-217702 | 8/1997 |
| JP | 10-317430 | 12/1998 |
| JP | 2000-283107 | 10/2000 |
| JP | 2002-348918 A | 12/2002 |
| JP | 2003102106 A * | 4/2003 |
| JP | 2004-150305 | 5/2004 |
| JP | 2004150305 A * | 5/2004 |
| JP | 2005-9381 A | 1/2005 |
| JP | 2005-194978 A | 7/2005 |

* cited by examiner

*Primary Examiner*—Walter Benson
*Assistant Examiner*—Antony M Paul
(74) *Attorney, Agent, or Firm*—Oblon, Spivak, McClelland, Maier & Neustadt, P.C.

(57) ABSTRACT

In a hybrid construction machine, its display device displays, toward an operator, an artificial engine sound serving as load information according to a magnitude of a workload, instead of an engine sound. Furthermore, the display device issues an alarm sound to surrounding workers when performing an operation by only stored electrical power of an electrical energy storage device without using an engine. In this hybrid construction machine, in addition to the issuing of alarm from the display device during the operation without using the engine, the display device issues an advance notice sound for engine restart when at least one value out of the workload and a charge amount of the electrical energy storage device has become an advance notice set value close to a set value of engine restart.

8 Claims, 7 Drawing Sheets

US 7,487,023 B2

CONSTRUCTION MACHINE

BACKGROUND OF THE INVENTION

1. Field of the Invention

The present invention relates to a hybrid construction machine using engine power and stored electrical power of an electrical energy storage device in combination.

2. Description of the Related Art

Hybrid construction machinery is classified into a series type and a parallel type in accordance with the way of using engine power and stored electrical power. An example of the parallel type is disclosed in Japanese Unexamined Patent Application Publication No. 2004-150305.

In a common hydraulic shovel, which is not based on a hybrid mode, its engine sound varies depending on the magnitude of a workload. Usually, an operator estimates the workload by listening to the engine sound, and feeds back the estimated result to the operation of the hydraulic shovel. For example, if the operator estimates that the load is large, he/she performs an operation in a direction reducing the load.

Surrounding workers recognize, at the engine sound, that the machine is operating, and take caution.

That is, in the construction machine, its engine sound constitutes information that is important for the operator and surrounding workers, from the aspects of safety and operation.

In the hybrid system, both of the series and parallel types are configured so that, basically, an electrical energy storage device compensates for a shortage of an engine output. As a result, while the hybrid system is operating, the engine sound does not change, or little changes in spite of changes in the workload. In other words, the engine sound, which serves as operation information, is not conveyed to the operator.

This makes it impossible to estimate the load, and hence, the above-described conventional way of feeding back the engine sound to operations cannot be used. In addition, the operator develops an illusion that the load is small, or the machine itself is lacking in power. This incurs a reduction in work efficiency.

On the other hand, in the series type, as will be described later, when preset engine stop conditions (a small load as well as a large amount of charge) have been satisfied, the engine is automatically stopped, and the construction machine automatically transfers to a state of performing the operation by its stored electrical power alone without using the engine. Thus the engine sound disappears.

As a result, especially surrounding workers might not notice that the machine is operating.

A technique for preventing surrounding workers from the machine is disclosed in the above-described Japanese Unexamined Patent Application Publication No. 2004-150305.

According to this technique, in the parallel type, from the viewpoint of energy saving, the engine is configured so as to be automatically stopped when an operation lever is put into its neutral position, and restarted upon operation of the lever. On that premise, when the lever is in the neutral position, the machine is arranged to issue an alarm indicating that "upon operation of the lever, the machine starts to move", for alerting surrounding workers.

The reason why the alarm is issued only when the lever is in the neutral position and no alarm is issued when the lever is operated, is because, when the lever is operated, the engine moves without fail and the workers can recognize, at that engine sound, that the machine is operating.

However, in the series type, there exists a specific situation of "operation without using the engine" wherein, if given conditions have been satisfied, the engine is stopped irrespective of the presence/absence of a lever operation, and the machine moves under stored electrical power even during engine stop, this situation existing in common construction machinery and parallel typed hybrid construction machinery. For this reason, if the known technique in which no alarm is issued during the operation of lever is diverted toward the series type just as it is, the safety of workers cannot be ensured.

In other words, in the series type, it is the lever operating period during which the machine is moving without an engine sound that poses a danger to the workers. Nevertheless, this technique cannot address this problem. Worse still, there is a possibility that workers will confuse a non-alarm state with safety, resulting in an even more significant danger.

In this manner, in the conventional construction machinery, there have been occurred inherent problems based on that the information that the construction machine is in operation, and the engine sound information indicating the magnitude of a workload are not conveyed to the operator or surrounding workers, or not correctly conveyed to them.

As an example of the series type, Japanese Unexamined Patent Application Publication No. 2000-283107 discloses a series type hybrid system. In this system, with at least one value out of a workload and the charge amount of an electrical energy storage device as a determining factor, when the value has reached an engine stop set value, the engine is automatically stopped, and an operation is performed by only stored electrical power of the electrical energy storage device without using the engine. Then, when the values of the above-described determining factors have reached the engine restart set values, the engine is automatically restarted.

To explain it with reference to a typical instance:

(i) when the conditions that the workload value is a set value or less (small load) and simultaneously the charge amount of an electrical energy storage device is a set value or more (large charge amount; for example, 65% or more of the full charge state) have been satisfied, the engine is automatically stopped, and the hybrid system is transferred to an operating state without using the engine, with the motor driven by stored electrical power alone.

(ii) during this operation without using the engine, when the workload value has become higher than the set value, or the charge amount has become lower than the set value (small charge amount; for example, lower than 50% of the full charge state), the hybrid system is controlled to return to the hybrid operation by automatically restarting the engine.

Thereby, the hybrid system is intended to stably operate the engine in a high efficiency region, and perform an energy-saving operation by causing the electrical energy storage device to compensate for a shortage of an engine output with respect to the workload, while keeping the charge amount of the electrical energy storage device within a fixed range.

However, the transfer from the operation without using the engine to the engine restarting was automatically executed irrespective of an intention of the operator. Such an abrupt engine restart has taken the operator and surrounding workers by surprise, and has been detrimental to their mental health.

Also, the engine restart in the progress of performing a fine operation with the operator's attention concentrated thereon, might disturb the operator to thereby cause him/her to miss aim, thereby exerting a harmful effect on work efficiency. An improvement in this respect has therefore been required.

SUMMARY OF THE INVENTION

Accordingly, it is an object of the present invention to provide a hybrid construction machine, in both of the series and parallel types, capable of correctly convey workload information in place of an engine sound to an operator. It is another object of the present invention is to provide a hybrid construction machine, in a series type, capable of ensuring safety by issuing an appropriate alarm according to an operating state. It is a further object of the present invention is to provide a hybrid construction machine capable of giving an advance notice of a restart to user and others.

The basic constitution of the construction machine according to the present invention will be given below.

A construction machine according to one aspect of the present invention includes an engine, a power generator driven by the engine, and an electrical energy storage device that is charged by an output of the power generator. The electrical energy storage device compensates for a shortage of an output of the engine with respect to the workload while storing power generated by the power generator using a surplus of the output. Furthermore, this construction machine includes load detecting means for detecting the workload, and display means that displays, toward an operator, load information according a magnitude of detected workload, instead of an engine sound.

With this feature, inherent problems based on that the engine sound is not conveyed to the operator or surrounding workers, or not correctly conveyed to them, can be solved, and safety and work efficiency can be improved.

That is, since load information according to the magnitude of a detected workload is displayed instead of an engine sound, toward the operator, it is possible to directly apply the method used in common construction machinery, in which method, in both of the series and parallel types, the operator estimates the magnitude of a load and feeds back the estimated result to operations. Furthermore, it is possible to eliminate the possibility that the operator develops an illusion that the load is small, or the machine itself is lacking in power. This contributes to the improvement in work efficiency.

A construction machine according to another aspect of the present invention includes an engine; a power generator driven by the engine; a motor driven by an output of the power generator; one or more actuators operated by the motor; an electrical energy storage device that stores surplus power out of the output of the power generator. The electrical energy storage device allows an operation to be performed by only stored electrical power thereof without using the engine, with the engine stopped under preset engine stop conditions. Furthermore, this construction machine further includes display means adapted to issue an alarm when the engine stop conditions have been satisfied.

In this case, in the series type, since the machine is configured so as to issue an alarm when the engine stop conditions have been satisfied, it is possible to alert surrounding workers by issuing an alarm even at the lever operating period during which the machine is moving without an engine sound. This allows the safety of workers to be enhanced. Here, the time when the conditions have been satisfied refers to, for example, the time when the workload value has become a set value or less, as well as the charge amount has become a set value or more.

The construction machine according to a further aspect of the present invention includes an engine; a power generator driven by the engine; a motor driven by an output of the power generator; one or more actuators operated by the motor; an electrical energy storage device that stores surplus power out of the output of the power generator; detecting means that detects at least one value out of a workload and a charge amount of the electrical energy storage device, as a factor in determining whether the engine is to be stopped or restarted. The detecting means is configured so that, when a value detected thereby has reached an engine stop set value, the engine is automatically stopped and an operation is performed by only stored electrical power of the electrical energy storage device without using the engine, and that when the detected value has reached an engine restart set value, the engine is automatically restarted. This construction machine further includes display means adapted to perform an advance notice display of an engine restart, when the detected value has become an advance notice set value close to the engine restart set value after the engine has been automatically stopped.

In this case, after an automatic stop of the engine (during operation without using the engine), when at least one value out of the workload and the charge amount of the electrical energy storage device, that is, a factor in determining whether the engine is to be stopped or restarted, has become the advance notice set value close to the engine restart set value, the advance notice set value for engine restart is performed by the display means. Therefore, it is possible to make aware the operator and surrounding workers of the engine restart, immediately before the engine restart.

This prevents an abrupt engine restart from impairing the mental health of the operator, or from giving a mental disturbance to the operator to thereby exert a harmful effect on operations.

DESCRIPTION OF THE PREFERRED EMBODIMENTS

Figure 7:
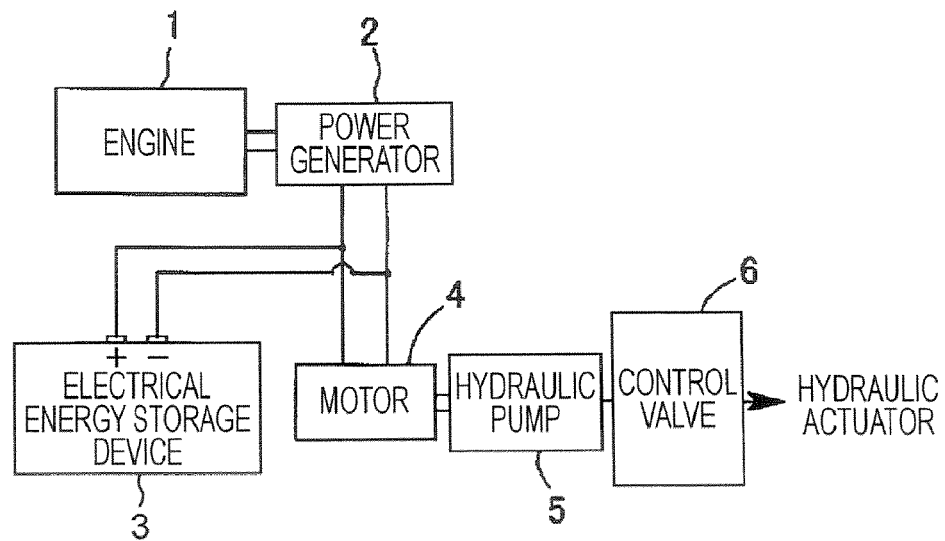
FIG. 7 is a schematic block diagram of the constitution of a series type drive system and control system in a hybrid construction machine.
Figure 8:
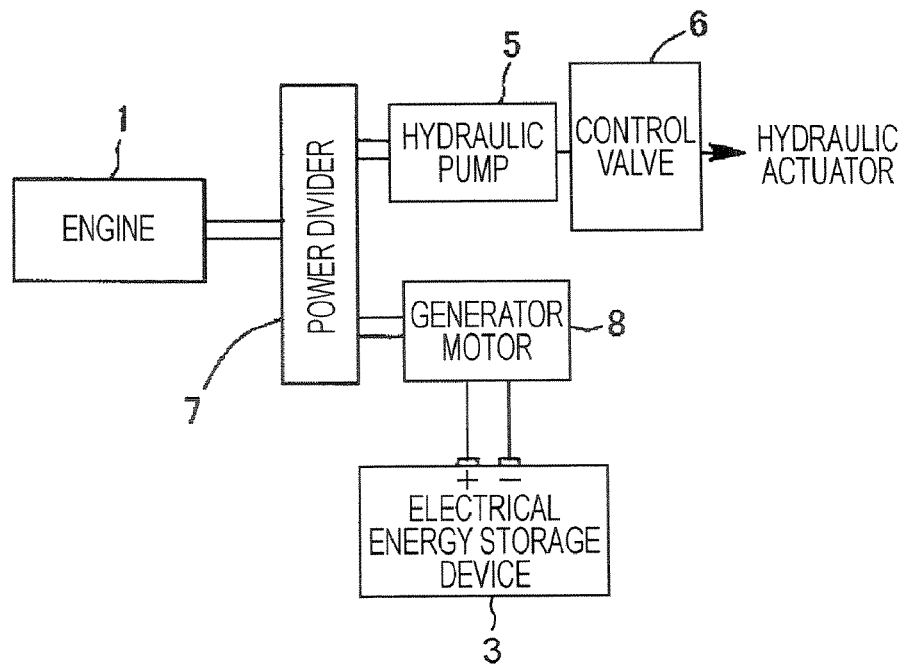
FIG. 8 is a schematic block diagram the constitution of a parallel type drive system and control system in a hybrid construction machine.

Regarding hybrid construction machines into which the present invention is incorporated, the schematic constructions of drive systems and control systems in the series and parallel types are shown in FIGS. 7 and 8, respectively.

As shown in FIG. 7, in the series type, an engine 1 drives a power generator 2; the power generator 2 charges an electrical energy storage device 3 by its power output; the power generator 2 and electrical energy storage device 3 drives a motor 4; and the motor 4 drives a hydraulic pump 5.

Hydraulic actuators (e.g., in the case of a shovel, hydraulic cylinders each for a boom, arm, and bucket; right and left travel hydraulic motors; etc) are connected to the hydraulic pump 5 via control valves 6, and theses hydraulic actuators are driven by pressure oil supplied from the hydraulic pump 5.

In contrast, in the parallel type, as shown in FIG. 8, the hydraulic pump 5 and a generator motor 8, into which the functions of a generator and motor have been combined, are connected in parallel to the engine 1 via a power divider (may referred to as PTO) 7, and these are concurrently driven by the engine 1.

Such a hybrid system is intended to operate an energy-saving operation by stably operating the engine 1 in a high-efficiency region, causing the electrical energy storage device 3 to compensate for a shortage of engine output with respect to the workload, generating power by the power generator 2 or generator motor 8 using a surplus of the output, and storing the power in the electrical energy storage device 3.

Specifically, in the series type, when the workload is large, the motor 4 is driven by a discharge power from the electrical energy storage device 3 in addition to a generated output, and when the workload is small, a surplus of the generated output is stored in the electrical energy storage device 3.

Also, when the workload value has become a set value or less (small load) as well as the charge amount of the electrical energy storage device 3 has become a set value or more (large charge amount), the engine 1 is stopped and the motor 4 is driven by only stored electrical power of the electrical energy storage device 3.

On the other hand, in the parallel type, when the workload is large, the generator motor 8 is caused to perform the motor function by stored electrical power of the electrical energy storage device 3 to thereby compensate for an engine output, and when required power is small, the generator motor 8 is caused to perform the generator function by a surplus of the engine output to thereby store electrical energy the electrical energy storage device 3.

Next, embodiments according to the present invention will be described with reference to FIGS. 1 to 6.

Figure 1:
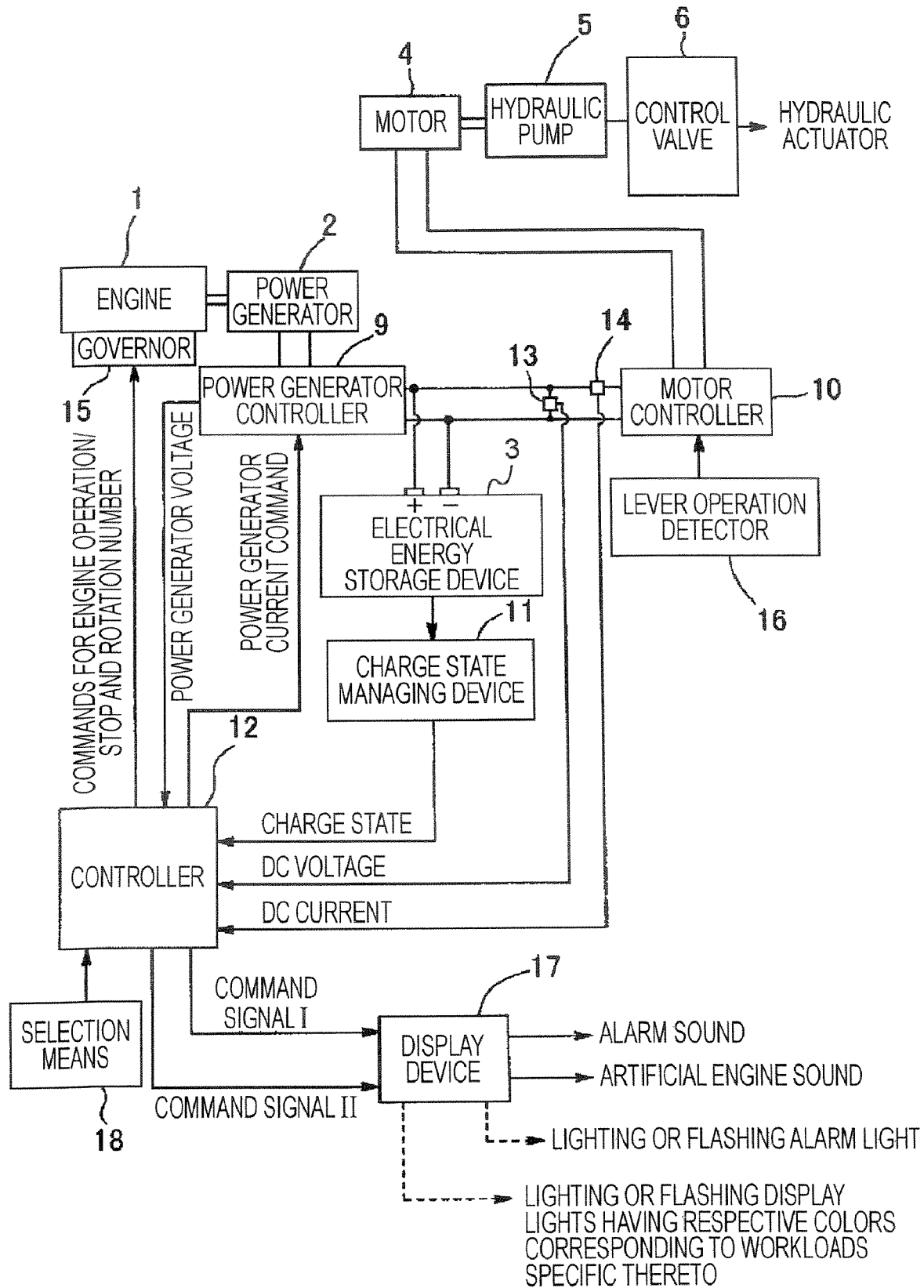
FIG. 1 is a block diagram of the constitution of a drive system and control system of a construction machine according to a first embodiment of the present invention.
Figure 2:
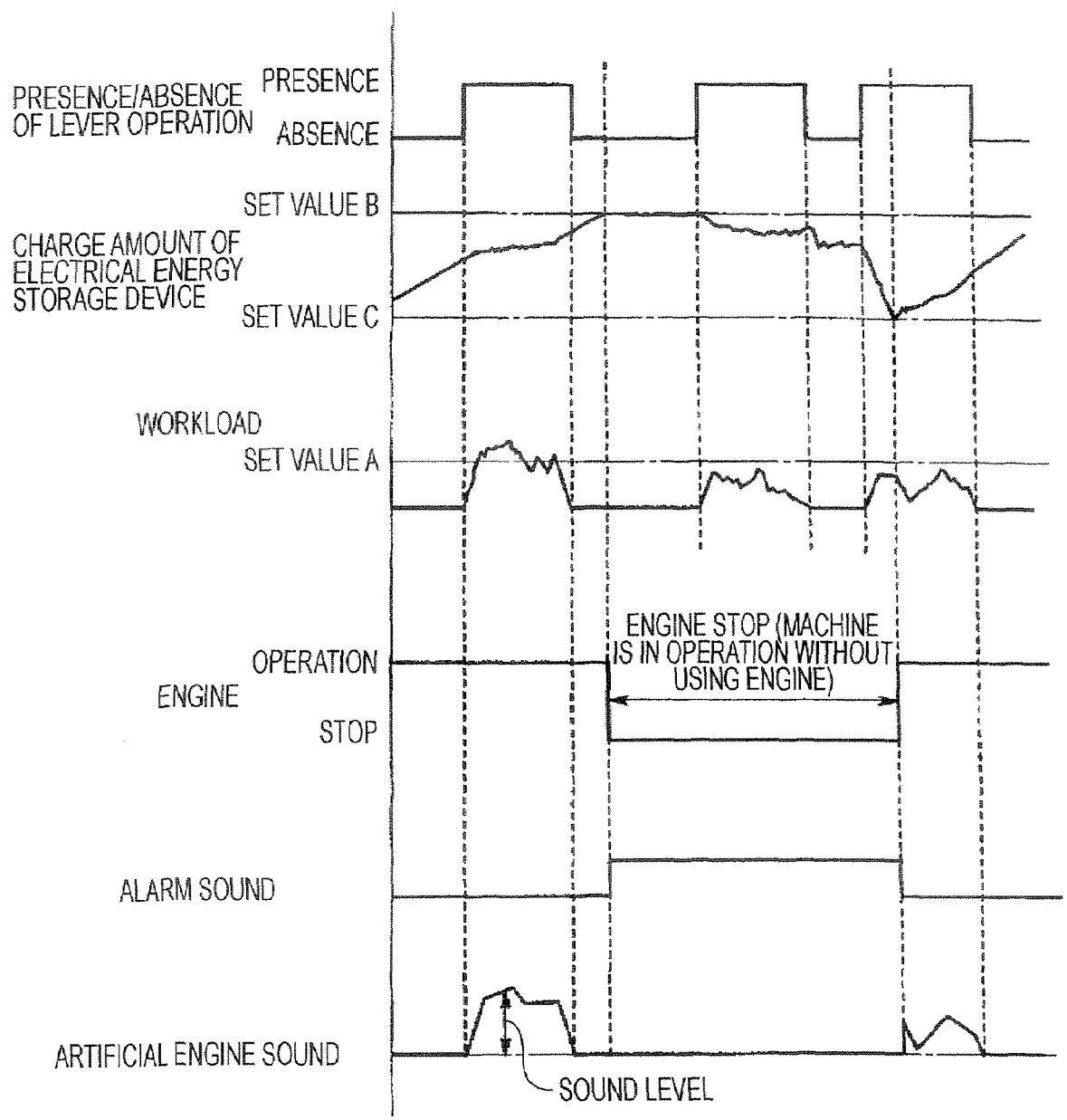
FIG. 2 is a time chart explaining operations of the construction machine according to the first embodiment.

First Embodiment (Refer to FIGS. 1 and 2)

The construction machine according to a first embodiment is of series type.

In the first embodiment and other embodiments (described later) of the present, the same parts as those in FIGS. 7 and 8 are designated by the same reference numerals, and description thereof is omitted to avoid redundancy.

As shown in FIG. 1, in the series type, the output of the power generator 2 is sent to the electrical energy storage device 3 via the power generator controller 9.

Also, the output of the power generator 2 and that of the electrical energy storage device 3 are sent to the motor 4 via the motor controller 10, whereby the motor 4 rotates to thereby drive the hydraulic pump 5.

The charge amount of the electrical energy storage device 3 is detected by the charge state managing device 11 and sent to the controller 12.

Inputted to this controller 12, are, besides a charge amount, a DC voltage and DC current, respectively, detected by a voltage sensor 13 and current sensor 14 that are provided in a DC circuit connecting the power generator controller 9 and motor controller 10. Based on these pieces of input information, commands of operation/stop and rotation number of the engine 1 with respect to the governor 15, and a power generator current command with respect to the power generator controller 9 are outputted.

On the other hand, a lever operation detector 16 for detecting a lever operation amount is connected to the motor controller 10. The lever operation detector 16 controls the operation/stop of the motor 4 and rotation speed (discharge rate of the hydraulic pump 5=actuator speed) thereof in accordance with the lever operation amount.

In this embodiment, a display device 17 is connected to the controller 12.

The display device 17 has a sounding body such as a buzzer or chime, and based on a command signal I or II from the controller 12, the display device 17 issues a sound that serves as an alarm or load information, toward the operator and surrounding workers.

Hereinafter, operations of the construction machine according to this embodiment will be specifically described with reference to FIG. 2 in combination with FIG. 1.

(i) The workload is determined by the controller 12, based on information on a DC voltage and DC current. When the workload value has become a set value A or less (small load) and simultaneously the charge amount has become a set value B or more (large charge amount), the engine 1 is stopped irrespective of the presence/absence of lever operation, and the machine enters an operating state without using the engine, with the motor 4 driven by stored electrical power alone.

Meanwhile, FIG. 2 shows an instance in which the machine has entered an operating state without using the engine because the charge amount has exceeded the set value B while keeping the workload value at the set value A or less. However, conversely, even when the workload value falls from the set value A or more to a value lower than that while keeping the charge amount at the set value B or more, the machine enters an operating state without using the engine. A set value C in FIG. 2, as a charge amount of the electrical energy storage device 3, is a set value at which the engine 1 is to be started.

Once the machine has entered the operating state without using the engine, the controller 12 sends a command signal I to the display device 17. Based on this command signal I, the display device 17 issues an alarm sound (e.g., an intermittent chime sound or buzzer sound) indicating that the machine has entered an operating state without using the engine, namely, that "the machine is in operation although no engine sound is being emitted".

By this alarm sound, it is possible to convey to surrounding workers that the machine is in operation without using the engine, for alerting them. This allows the safety of the workers to be enhanced.

(ii) During an operation performed while running the engine, the controller 12 outputs a command signal II associated with the workload, to the display device 17, and based on this command signal II, the display device 17 issues an artificial engine sound.

In FIG. 2, an example is shown in which an artificial engine sound that continuously varies in the sound level depending on an increase or decrease of a load. However, besides the artificial engine sound, a continuous sound of which the sound level rises with an increased load, or an intermittent sound of which the time interval decreases with an increased load, may also be issued.

By the artificial engine sound, it is possible to directly apply the method used in common construction machinery, in which method the operator estimates the magnitude of a load and feeds back the estimated result to operations. Furthermore, it is possible to eliminate the possibility that the operator develops an illusion that the load is small, or that the machine itself is lacking in power. This contributes to the improvement in work efficiency.

In particular, since the artificial engine sound is a sound display, it gives little feeling of strangeness to the operator, who is accustomed to estimate a load by a sound (engine sound), as compared with the case in common construction machinery. Also, the artificial engine sound is prone to allow load information to be correctly grasped as compared with display methods appealing vision such as characters and light, as well as does not interfere with operations. These features even more enhance work efficiency.

Here, the alarm sound and artificial engine sound may be issued from separate sounding bodies, or alternatively may be issued from the same sounding body, as discernable individual sounds.

On the other hand, when no load information is particularly needed, or when there are no workers who are to be alerted, around the machine, the artificial engine sound or alarm sound is useless, and what is even worse, it might grate on ears of the operator and workers.

With this being the situation, in this embodiment, as shown in FIG. 1, selection means (e.g., a switch) 18 is connected to the controller 12, so that, by the selection means 18, the operator can arbitrarily select whether one or both of the command signals I and II are to be outputted from the controller 12 to the display device 17, namely, whether one or both of the alarm sound during the operation without using the engine and the artificial engine sound during an ordinary operation are to be issued from the display device 17.

Figure 3:
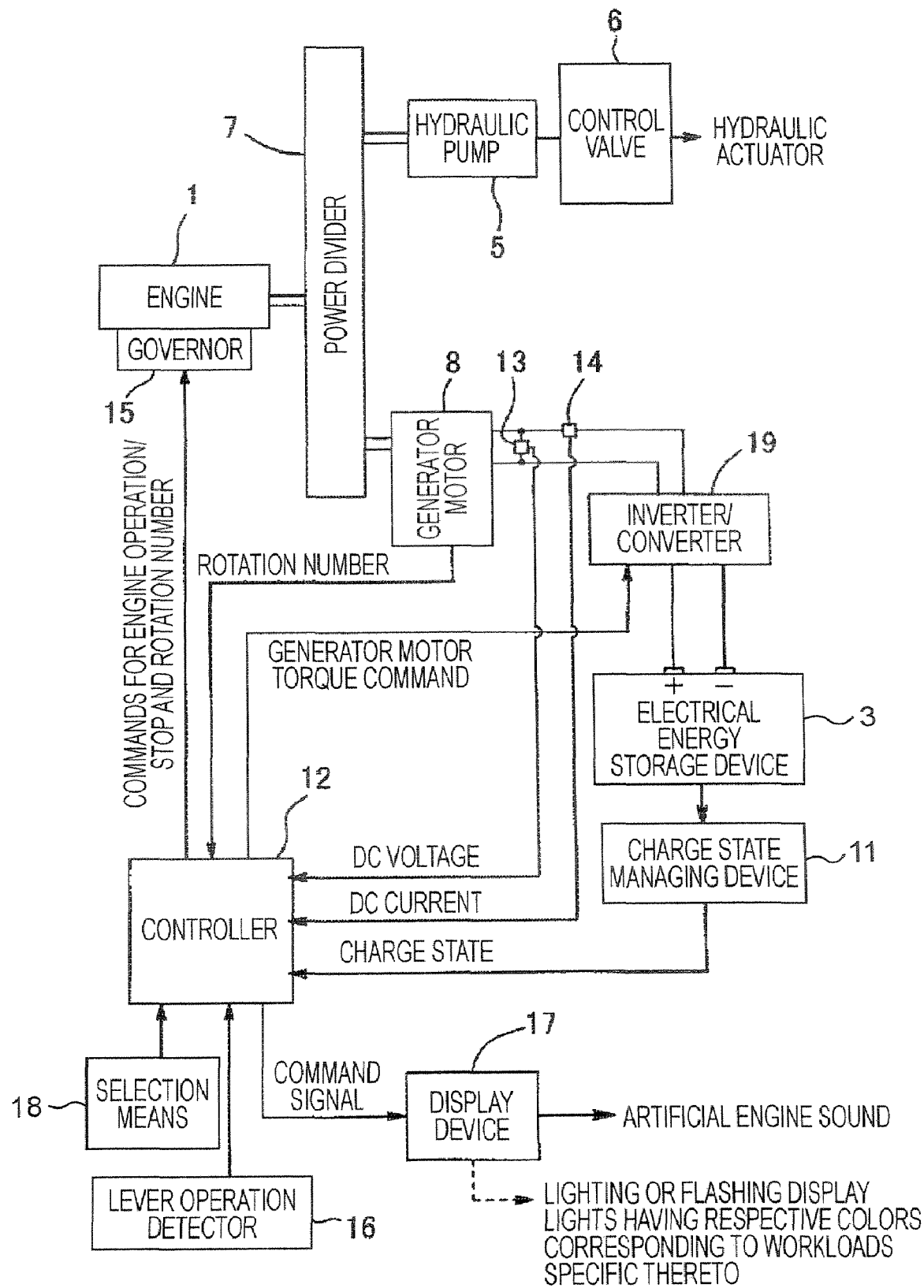
FIG. 3 is a block diagram of the constitution of a drive system and control system of a construction machine according to a second embodiment of the present invention.

Second Embodiment (Refer to FIG. 3)

The construction machine according to a second embodiment is of parallel type. Here, description is made of only the difference of the second embodiment from the first embodiment.

In the parallel type, the electrical energy storage device 3 is connected to the generator motor 8 via an inverter/converter 19, and the charge/discharge of the electrical energy storage device 3 is controlled in response to the shortage/surplus of a power generator output of the generator motor 8.

The inverter/converter 19 performs the switching between the generator function and motor function of the generator motor 8, the control of generated output (the rotation number of the generator motor 8), the torque control of the generator motor 8 based on a command from the controller 12, and so on.

As described above, in the parallel type, the engine 1 always runs during operations, and there is provided no operating state without using the engine, unlike the series type in the first embodiment.

In the second embodiment, therefore, during ordinary operations, the controller 12 sends, to the display device 17, a command signal (the same as the command signal I in the first embodiment) that is associated with a workload, in accordance with a workload detected by the voltage sensor 13 and current sensor 14, and the display device 17 generates only an artificial engine sound according to the workload.

Thereby, as in the case of the series type in the fist embodiment, the parallel type also allows the operator to estimate the magnitude of a load and feed back the estimated result to operations, thus contributing to an improvement in work efficiency.

In terms of a display effect, it is desirable that the alarm issued when the engine stop conditions have been satisfied, and the load information according to the magnitude of a workload be displayed as a sound, as in the above-described both embodiments. However, in a work environment requiring quietness, such as nighttime work, or a workplace in a resident street or its neighborhood even during the daytime, a display by a sound might cause a noise problem.

Such being the case, instead of using this display by a sound, other display methods may be used.

For example, in the first embodiment, as an alarm to be issued when the engine stop conditions have been satisfied, an alarm light may be lighted or flashed by the display device 17 as shown by a dotted line in FIG. 1.

On the other hand, in the first and second embodiments, as a display method for load information, display lights having respective different colors corresponding to the magnitudes of workload, specific to the display lights, may be lighted or flashed by the display device 17 (as a specific example, three-color lights may be lighted or flashed one by one in accordance with the workload).

The arrangement may also be such that a selection between the display by a sound and the display by an alarm light or display light can be arbitrarily performed in accordance with a work environment.

Alternatively, depending upon a work environment, the display by a sound and other displays may be used in combination.

The above-described alarm light or display light may be disposed in a cab or outside the machine. Alternatively, both lights may be disposed in the cab and outside the machine.

When the display light is disposed in the cab, a load level may be displayed on the display screen as the height of a bar graph that changes in accordance with a load.

Figure 4:
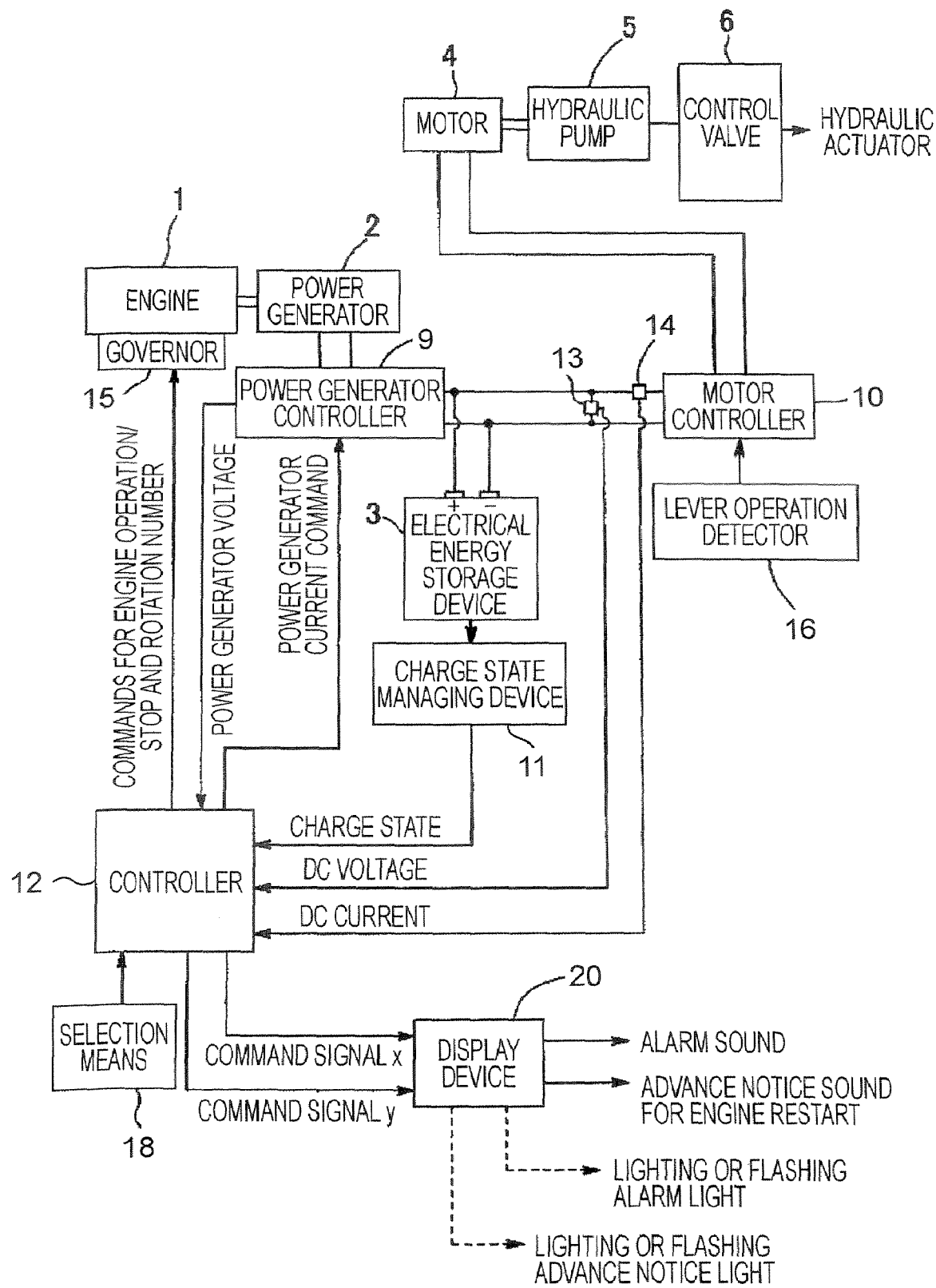
FIG. 4 is a block diagram of the constitution of a drive system and control system of a construction machine according to a third embodiment of the present invention.

Third Embodiment (Refer to FIG. 4)

FIG. 4 is a block diagram of the construction of a drive system and control system of a construction machine that is of series type, according to a third embodiment of the present invention. In FIG. 4, the same parts as those in FIG. 7 are designated by the same reference numerals, and description thereof is omitted to avoid redundancy.

As shown in FIG. 4, an output of the power generator 2 is sent to the electrical energy storage device 3 via the power generator controller 9.

Also, the output of the power generator 2 and that of the electrical energy storage device 3 are sent to the motor 4 via the motor controller 10, whereby the motor 4 rotates to thereby drive the hydraulic pump 5.

The charge amount of the electrical energy storage device 3 is detected by the charge state managing device 11 and sent to the controller 12.

Inputted to this controller 12, are, besides a charge amount, a DC voltage and DC current, respectively, detected by a voltage sensor 13 and current sensor 14 that are provided in a DC circuit connecting the power generator controller 9 and motor controller 10. Based on these pieces of input information, commands of operation/stop and rotation number of the engine 1 with respect to the governor 15, and a power generator current command with respect to the power generator controller 9 are outputted.

On the other hand, a lever operation detector 16 for detecting a lever operation amount is connected to the motor controller 10. The lever operation detector 16 controls the operation/stop and rotation speed (discharge rate of the hydraulic pump 5=actuator speed) of the motor 4 in accordance with the lever operation amount.

In this embodiment, a display device 20 is connected to the controller 12.

The display device 20 has a sounding body such as a buzzer or chime, and based on a command signal x or y from the controller 12, it issues an alarm or an advance notice sound for engine restart.

Figure 5:
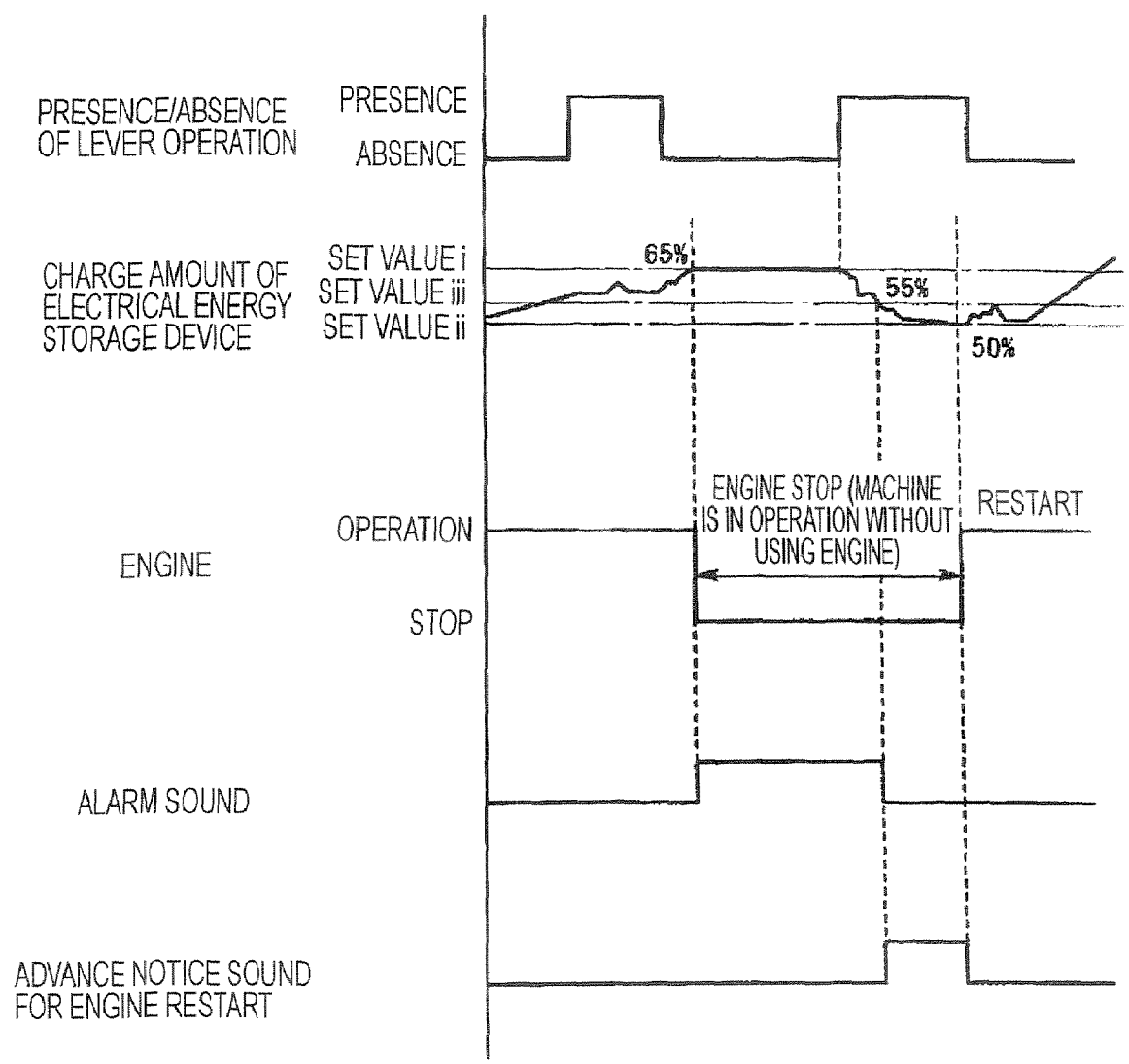
FIG. 5 is a time chart showing the timing of engine restart and the timing of issuing an advance notice sound for engine restart, based on the charge amount of an electrical energy storage device, in the third embodiment.

Hereinafter, operations of the construction machine according to this embodiment will be specifically described with reference to FIG. 5 in combination with FIG. 4.

The construction machine according to this embodiment is configured so that both of the workload and charge amount of the electrical energy storage device 3 are taken as factors in determining whether the engine is to be stopped or restarted, and that the engine 1 is either stopped or restarted based on the values of the above-described both factors.

That is, the workload is detected by the controller 12 from information on a DC voltage and DC current, and when the detected value of the workload has become a set value or less (small load) and simultaneously the detected value of charge amount detected by the charge state managing device 11 has become the set value i (e.g., 65% of the full charge state) or more, the engine 1 is stopped irrespective of the presence/absence of the lever operation, and the machine enters an operating state without using the engine, with the motor 4 driven by stored electrical power alone.

Herein, the workload is omitted from FIG. 5 on the assumption that it is kept below a set value from start to finish.

Once the machine has entered the operating state without using the engine, the controller 12 sends a command signal x to the display device 20, and based on this command signal x, the display device 20 issues an alarm sound (e.g., an intermittent chime sound or buzzer sound) indicating that the machine has entered an operating state without using the engine, namely, that "the machine is in operation although no engine sound is being emitted".

By this alarm sound, it is possible to convey to especially surrounding workers that the machine is in operation without using the engine, for alerting them. This allows the safety of the workers to be ensured.

Even after the machine has been transferred to the operating state without using the engine, the charge amount is detected by the charge state managing device 11 and controller 12, and if the detected value has fallen to a value below the set value ii (e.g., 50% of the full charge state) that is lower than the set value i, a signal is sent from the controller 12 to the governor 15, and the engine 1 is automatically restarted.

In this embodiment, immediately before the restart of engine, i.e., when a detected value of charged amount has come down below an advance notice value iii (e.g., 55% of the full charge state) that is intermediate value between the set values i and ii, the command signal from the controller 12 to the display device 20 is switched from the hitherto-used command signal x to a command signal y.

Thereby, in place of the alarm sound indicating that the machine is in operation without using the engine, the display device 20 issues a restart advance notice sound giving an advance notice of an engine restart, until the engine is restarted.

Instead of using an intermittent chime sound serving as an alarm sound, the above-described engine restart advance notice sound may use, for example, a sound quite different in the type from the alarm sound, such as a buzzer sound, using a sound source other than that of the alarm sound. For example, the restart advance notice sound may use a sound formed by reducing the time interval of the intermittent chime sound serving as an alarm sound. Thus, the restart advance notice sound may use a sound formed by varying the sound quality, pattern, or sound level of a sound source common to the alarm sound and restart advance notice sound.

Since the advance notice display of engine restart is executed as described above, it is possible to make the operator and surrounding workers aware of an engine restart immediately before it.

This prevents an abrupt engine restart from impairing the mental health of the operator, or from giving a mental disturbance to the operator to thereby exert a harmful effect on operations.

In particular, since the advance notice of engine restart is performed by a sound, this advance notice method is high in the advance notice effect as compared with advance notice methods that appeal vision, such as characters and light. In addition, since the advance notice by a sound needs no movement of sight line, it does not interfere with operations, thereby exerting a preferable effect on work efficiency.

In this embodiment, an alarm sound is issued even during engine stop, and a sound formed by modifying this alarm sound is used as an advance notice sound for engine restart. As a result, the operator becomes less prone to disturbance as compared with the case in which the advance notice sound alone is abruptly issued, and further the modification of the sound can be easily recognized as an advance notice of engine restart. This allows an engine restart advance notice effect to be even more enhanced.

Meanwhile, when an alarm indicating that the machine is in operation without using the engine, and an advance notice of engine restart, are not particularly needed, the alarm sound or advance notice sound is useless, and what is even worse, it might grate on ears of the operator and workers.

With this being the situation, in this embodiment, as shown in FIG. 4, selection means (e.g., a switch) 18 is connected to the controller 12, so that, by the selection means 18, the operator can arbitrarily select whether one or both of the command signals x and y are to be outputted from the controller 12 to the display device 20, namely, whether one or both of the alarm sound and the advance notice sound for engine restart that are issued during the operation without using the engine are to be issued from the display device 20.

Figure 6:
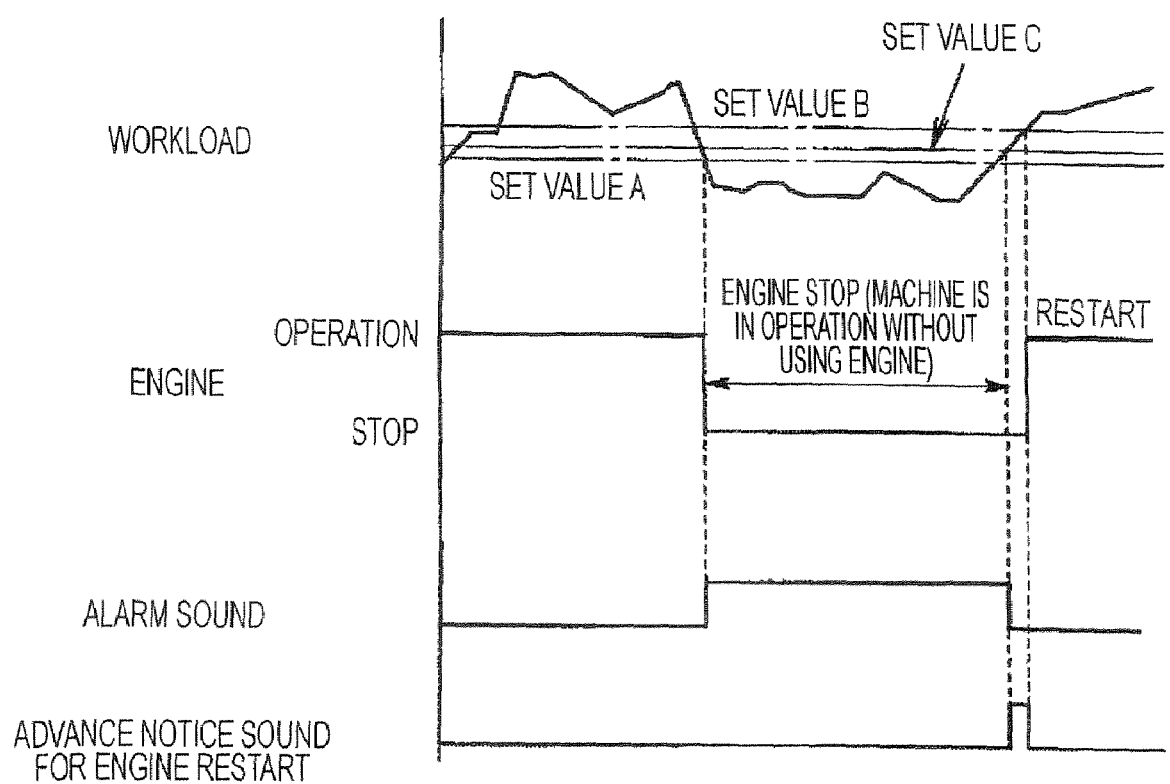
FIG. 6 is a time chart showing the timing of engine restart and the timing of issuing an advance notice sound for engine restart, based on the workload, in the third embodiment.

FIG. 6 shows the timings of engine stop/restart and timings of issuing an alarm sound and an advance notice sound for engine restart, based on the workload.

Here, an instance is given in which the engine 1 is stopped when the workload has become the set value A or less, and in which the engine is restarted when workload has become the set value B (>set value A) or more.

In this case, an alarm sound is issued during an operation without using the engine, and when the workload has reached the advance notice value C that is more than the set value A less than the set value B, the alarm sound is stopped, and an advance notice sound for engine restart is instead issued.

During the operation without using the engine, the charge amount of the electrical energy storage device goes on decreasing while the workload increases or decreases, so that there is a problem that the timing of an advance notice sound for engine restart is difficult to determine.

One possible countermeasure against this problem is, at the mention of the shovel for example, to previously search for one standard pattern or a plurality of representative patterns regarding the change in workload for each kind of excavation, earth leveling work, etc., as well as an advance notice set value for engine restart for each pattern to thereby make a database of these patterns, and then to discriminate the pattern in accordance with the change in load factor by operation discrimination means installed in the controller 12, whereby the advance notice set value for engine restart is issued.

Even if the engine restart is not executed because the workload decreases after the advance notice sound has been issued, it does not do actual harm to work and operation except that the advance notice sound is wasted.

In terms of a display effect, it is desirable that the alarm and the advance notice for engine restart that are issued during the operation without using the engine be displayed as a sound. However, in a work environment requiring quietness, such as nighttime work, or a workplace in a resident street or its neighborhood even during the daytime, a display by a sound might cause a noise problem.

Such being the case, in place of this display by a sound, other display methods may be used.

For example, as the alarm display and advance notice display of engine restart that are issued during the operation without using the engine, an alarm light or advance notice light may be lighted or flashed by the display device 20 as shown by dotted lines in FIG. 4.

In this case, the arrangement may be such that the alarm light and advance notice light are separately provided, and that they are independently lighted or flashed. Here, in order to clarify their differences, it is desirable to change the way of displaying, for example, by making them have colors different from each other.

Alternatively, the arrangement may also be such that the same display light is shared for an alarm and advance notice, and the distinction between them is made by changing the way of displaying, for example, using a method wherein this display light is lighted during the operation without using the engine whereas it is flashed just prior to engine restart, or a method wherein the time period of flashing is set to be long for the alarm light, and short for the advance notice light.

Still alternatively, a display other than a display light, for example, a character display on the display screen may be used.

The arrangement may be also such that a selection between the display by a sound and the other displays can be arbitrarily performed in accordance with a work environment.

Yet alternatively, depending upon a work environment, the display by a sound and the other displays may be used in combination in order to further enhance the display effect.

The above-described display light (alarm light or advance notice light) or the other display means may be disposed in the cab or outside the machine. Alternatively, they may be disposed both of the inside of the cab and outside of the machine.

Although the invention has been described with reference to the preferred embodiments in the attached figures, it is noted that equivalents may be employed and substitutions made herein without departing from the scope of the invention as recited in the Claims.

What is claimed is:

1. A construction machine comprising:
an engine;
a power generator driven by the engine;
an electrical energy storage device that is charged by an output of the power generator, the electrical energy storage device compensating for a shortage of an output of the engine with respect to the workload while storing power generated by the power generator using a surplus of the output;
load detecting means for detecting the workload; and
display means that displays, toward an operator, load information according to a magnitude of the detected workload, wherein said load information comprises a sound according to the magnitude of the workload.

2. A construction machine comprising:
an engine;
a power generator driven by the engine;
an electrical energy storage device that is charged by an output of the power generator, the electrical energy storage device compensating for a shortage of an output of the engine with respect to the workload while storing power generated by the power generator using a surplus of the output;
load detecting means for detecting the workload; and
display means that displays, toward an operator, load information according to a magnitude of the detected workload,
wherein the display means lights or flashes display lights having respective colors different in accordance with a magnitude of the workload.

3. A construction machine comprising:
an engine;
a power generator driven by the engine;
a motor driven by an output of the power generator; an actuator operated by the motor;
an electrical energy storage device that stores surplus power out of the output of the power generator;
detecting means that detects at least one value out of a workload and a charge amount of the electrical energy storage device, as a factor in determining whether the engine is to be stopped or restarted, the detecting means being configured so that, when a value detected by the detecting means has reached an engine stop set value, the engine is automatically stopped and an operation is performed by only stored electrical power of the electrical energy storage device without using the engine, and that when the detected value has reached an engine restart set value, the engine is automatically restarted; and
display means adapted to perform an advance notice display of an engine restart when the detected value has become an advance notice set value close to the engine restart set value, after the engine has been automatically stopped.

4. The construction machine according to claim 3, wherein the display means is adapted to issue an advance notice sound as an advance notice display.

5. The construction machine according to claim 3, wherein the display means lights or flashes an advance notice light as an advance notice display.

6. The construction machine according to claim 3, wherein the display means performs an alarm display notifying that an operation without using the engine is being performed during the stop of the engine; and
wherein a sound formed by modifying the alarm display is used as an advance notice display of engine restart.

7. The construction machine according to claim 3, further comprising:
selecting means for making a selection between the activation and the deactivation of the display means.

8. A construction machine comprising:
an engine;
a power generator driven by the engine;
an electrical energy storage device that is charged by an output of the power generator, the electrical energy storage device compensating for a shortage of an output of the engine with respect to the workload while storing power generated by the power generator using a surplus of the output;
load detecting means for detecting the workload; and
display means that displays, toward an operator, load information according to a magnitude of the detected workload, wherein said load information comprises a displayed character selected according to the magnitude of the workload.

* * * * *